(12) United States Patent
Iqra et al.

(10) Patent No.: US 11,837,726 B2
(45) Date of Patent: Dec. 5, 2023

(54) CATHODE ACTIVE MATERIAL FOR SECONDARY BATTERY, CATHODE FOR SECONDARY BATTERY INCLUDING THE SAME, SECONDARY BATTERY INCLUDING THE CATHODE FOR SECONDARY BATTERY, AND MANUFACTURING METHODS THEREOF

(71) Applicant: KOREA INSTITUTE OF SCIENCE AND TECHNOLOGY, Seoul (KR)

(72) Inventors: Moeez Iqra, Seoul (KR); Ji-Young Kim, Seoul (KR); Jaeho Park, Seoul (KR); Hee-Dae Lim, Seoul (KR); Hun-Gi Jung, Seoul (KR); Won Young Chang, Seoul (KR); Minah Lee, Seoul (KR); Seungho Yu, Seoul (KR); Kyung Yoon Chung, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 925 days.

(21) Appl. No.: 16/829,689

(22) Filed: Mar. 25, 2020

(65) Prior Publication Data
US 2021/0151756 A1    May 20, 2021

(30) Foreign Application Priority Data

Nov. 19, 2019  (KR) .................. 10-2019-0148373
Feb. 24, 2020  (KR) .................. 10-2020-0022346

(51) Int. Cl.
*H01M 4/58*    (2010.01)
*C01D 3/04*    (2006.01)
*H01M 4/02*    (2006.01)

(52) U.S. Cl.
CPC .............. *H01M 4/582* (2013.01); *C01D 3/04* (2013.01); *C01P 2002/72* (2013.01);
(Continued)

(58) Field of Classification Search
None
See application file for complete search history.

(56) References Cited

U.S. PATENT DOCUMENTS

2018/0309170 A1* 10/2018 Angell ................ H01M 10/399

FOREIGN PATENT DOCUMENTS

| JP | 10302830 A | 11/1998 |
|---|---|---|
| KR | 10-2019-0010494 A | 1/2019 |
| WO | 2019025663 A1 | 2/2019 |

OTHER PUBLICATIONS

Iqra Moeez et al., "Electrochemically Induced Metallization of NaCl: Use of the Main Component of Salt as a Cost-Effective Electrode Material for Sodium-Ion Batteries", ACS Energy Letters, 4, pp. 2060-2068, Jul. 11, 2019.
(Continued)

*Primary Examiner* — Lucas J. O'Donnell
(74) *Attorney, Agent, or Firm* — Rabin & Berdo, P.C.

(57) ABSTRACT

The present disclosure relates to a cathode active material for a secondary battery, a cathode for a secondary battery including the same, a secondary battery including the cathode for a secondary battery and manufacturing methods thereof. More particularly, it is possible to obtain a secondary battery having excellent electrochemical characteristics by electrochemically inducing a structural phase change in the cathode active material of a secondary battery including NaCl as a cathode active material.

5 Claims, 6 Drawing Sheets

(52) U.S. Cl.
CPC ...... *C01P 2002/76* (2013.01); *C01P 2002/77* (2013.01); *C01P 2002/85* (2013.01); *C01P 2004/04* (2013.01); *C01P 2006/40* (2013.01); *H01M 2004/021* (2013.01); *H01M 2004/028* (2013.01)

(56) References Cited

OTHER PUBLICATIONS

Xiaoyuan Li and Raymond Jeanloz, "Measurement of the B1-B2 transition pressure in NaCl at high temperatures", Physical Review B, vol. 36, No. 1, pp. 474-479, Jul. 1, 1987.

Dezhi Yang et al., "Journal of Materials Chemistry A", A Na4Fe(Cn)6/NaCl solid solution cathode material with an enhanced electrochemical performance for sodium on batteries, Sep. 9, 2013.

\* cited by examiner

CATHODE ACTIVE MATERIAL FOR SECONDARY BATTERY, CATHODE FOR SECONDARY BATTERY INCLUDING THE SAME, SECONDARY BATTERY INCLUDING THE CATHODE FOR SECONDARY BATTERY, AND MANUFACTURING METHODS THEREOF

CROSS-REFERENCE TO RELATED APPLICATIONS

This application claims, under 35 U.S.C. § 119, the priorities of Korean Patent Application Nos. 10-2019-0148373 and 10-2020-0022346 filed on Nov. 19, 2019 and Feb. 24, 2020, respectively, in the Korean Intellectual Property Office, the disclosure of which is incorporated herein by reference in its entirety.

TECHNICAL FIELD

The following disclosure relates to a cathode active material for a secondary battery, a cathode for a secondary battery including the same, a secondary battery including the cathode for a secondary battery, and manufacturing methods thereof. More particularly, the following disclosure relates to technology which includes electrochemically inducing a structural phase change in NaCl, and applying it to a secondary battery having excellent electrochemical characteristics.

BACKGROUND

Energy storage technologies, such as lithium ion secondary batteries (LIBs), have been used widely for portable electronic instruments, or the like, and have been studied intensively. However, since lithium is highly expensive due to its insufficient reserves, it shows a limitation in application to a large-scale energy storage system. To overcome such a limitation, sodium ion secondary batteries (NIBs) using inexpensive sodium having many reserves have been spotlighted. Since sodium is cheaper than lithium, has many resources and shows eco-friendly properties, it can be a good substitute for lithium ions. In addition, since sodium is positioned right below lithium in the Periodic table, the two elements are chemically similar and sodium ions suitably substitute for lithium ions. Particularly, NIBs having price competitiveness may be applied to electric vehicles and large-scale energy storage systems. Thus, recently, metal oxides having a layered structure, phosphates, carbonaceous materials, or the like have been studied as cathodes or anodes for NIBs. However, in the case of sodium, it is more sensitive to air as compared to lithium and shows an ion volume corresponding to about 2 times of the ion volume of lithium. Therefore, a sodium electrode has a voltage range (−2.71V vs. standard hydrogen electrode (SHE)) lower than the voltage range (−3.05V vs. SHE) of a lithium electrode. As a result, NIBs show lower electrochemical characteristics as compared to LIBs.

Thus, according to the present disclosure, alkali halide compounds, such as NaCl having high price competitiveness, have been studied as metallic electrode materials for NIBs. Among the alkali halide compounds, NaCl has been studied actively about its phase change and reaction mechanism thereof under pressure has been studied intensively. Particularly, many studies have been reported about metallization of NaCl under pressurization. However, such a method requires a high temperature of 1,000° C. or higher and a high pressure condition, and thus there is a difficulty in preparing production facilities and there is a risk necessarily caused by the high temperature/high pressure condition.

REFERENCES

Patent Documents (Patent Document 1) Korean Patent Laid-Open No. 10-2019-0010494

Non-Patent Documents (Non-Patent Document 1) Xiaoyuan Li and Raymond Jeanloz, Measurement of the B1-B2 transition pressure in NaCl at high temperatures, Phys. Rev. B 36, 474

SUMMARY

The present disclosure is designed to solve the problems of the related art, and an embodiment of the present disclosure is directed to providing a secondary battery having excellent capacity characteristics and cycle characteristics by inducing a structural phase change in NaCl through an electrochemical process and using the same as a cathode active material for a secondary battery.

In one aspect of the present disclosure, there is provided a cathode active material for a secondary battery including NaCl.

In another aspect of the present disclosure, there is provided a cathode for a secondary battery including the cathode active material for a secondary battery.

In still another aspect of the present disclosure, there is provided a secondary battery including the cathode for a secondary battery.

In still another aspect of the present disclosure, there is provided an electrical device including the secondary battery.

In still another aspect of the present disclosure, there is provided a method for preparing NaCl in B2 phase, including a step of carrying out electrochemical charge/discharge of NaCl in B1 phase.

In still another aspect of the present disclosure, there is provided a method for preparing a cathode for a secondary battery, including a step of carrying out electrochemical charge/discharge of NaCl in B1 phase.

In yet another aspect of the present disclosure, there is provided a method for manufacturing a secondary battery, including a step of carrying out electrochemical charge/discharge of NaCl in B1 phase.

According to the present disclosure, it is possible to obtain a secondary battery having excellent electrochemical characteristics by electrochemically inducing a structural phase change in the cathode active material of a secondary battery including NaCl as a cathode active material.

DETAILED DESCRIPTION OF EMBODIMENTS

Hereinafter, various aspects and embodiments of the present disclosure will be explained in more detail.

In one aspect of the present disclosure, there is provided a cathode active material for a secondary battery including NaCl.

Herein, NaCl may be present in B2 phase.

In general, NaCl is present in B1 phase. NaCl in B1 phase is not capable of Na ion intercalation/deintercalation and has significantly low discharge capacity, and thus is not suitable for a cathode active material. NaCl in B2 phase is preferred, since it is capable of reversible Na ion intercalation/deintercalation and can maintain the structure stably. In other words, both B1 phase and B2 phase are insulators. However, in the case of NaCl in B2 phase, it allows electrochemical Na ion intercalation/deintercalation, and thus can provide excellent electrochemical characteristics.

NaCl in B2 phase has a crystal structure of cubic system, belongs to a space group of Pm-3m, and has lattice parameters of a=2.8600-2.8630 Å, b=2.8600-2.8630 Å and c=2.8600-2.8630 Å. Such NaCl may have a $(100)_{B2}$ peak at a 2theta between 31.25° and 31.70° in X-ray diffractometry. The peak corresponds to a peak not observed in X-ray diffractometry of general NaCl in B1 phase.

In another aspect of the present disclosure, there is provided a cathode for a secondary battery including the cathode active material for a secondary battery.

In still another aspect of the present disclosure, there is provided a secondary battery including the cathode for a secondary battery.

Preferably, the secondary battery may be a sodium ion secondary battery.

In still another aspect of the present disclosure, there is provided an electrical device including the secondary battery.

The electrical device may be any one selected from communication devices, transport devices and energy storage devices.

In still another aspect of the present disclosure, there is provided a method for preparing NaCl in B2 phase, including a step of carrying out electrochemical charge/discharge of NaCl in B1 phase.

The step of carrying out electrochemical charge/discharge of NaCl in B1 phase may include the steps of: forming a secondary battery which includes a cathode active material including NaCl in B1 phase; a pre-charge step of charging the secondary battery to form a plurality of vacancies in the crystal structure of NaCl; and a pre-discharge step of discharging the secondary battery to cause a structural phase change of NaCl.

Active studies have been conducted about secondary batteries including an alkali metal halide compound or alkaline earth metal halide compound as a cathode active material in order to substitute for lithium secondary batteries. In the case of such secondary batteries, many studies have been conducted to induce a structural phase change of an alkali metal halide compound or alkaline earth metal halide compound into a structure capable of reversible intercalation/deintercalation of metal cations. However, the conventional methods require a high temperature and high pressure condition, and thus there are problems of a risk during the production process and a difficulty in preparing production facilities. The inventors of the present disclosure have found that a structural phase change of NaCl could be accomplished by using an electrochemical process, i.e. simple pre-charge/discharge steps. The method for preparing NaCl in B2 phase is based on this finding.

First, a secondary battery, which includes a cathode including NaCl in B1 phase as a cathode active material, an anode, a separator and an electrolyte, is formed.

The anode may include the same metal as the cathode active material. For example, the anode may be Na metal.

The separator may include polyethylene, polypropylene, polyvinylidene fluoride or a multilayer membrane having two or more layers thereof. For example, mixed multilayer membranes, such as a bilayer separator of polyethylene/polypropylene, trilayer separator of polyethylene/polypropylene/polyethylene, or trilayer separator of polypropylene/polyethylene/polypropylene, may be used, but the scope of the present disclosure is not limited thereto.

The cathode may be obtained by the method including the steps of: mixing a cathode active material, a conductive material and a binder in a solvent to obtain a slurry composition; and coating the slurry composition on a current collector, followed by drying.

The conductive material is used to impart conductivity to the electrode, and any electron conductive material may be used, as long as it causes no chemical change in the battery to be formed. Particular examples of the conductive material may include, but are not limited to: carbonaceous materials, such as natural graphite, artificial graphite, carbon black, acetylene black, Ketjen black, Denka black, carbon fibers, or the like; metal powder, such as copper, nickel, aluminum or silver, or metallic materials, such as metal fibers; conductive polymers, such as polyphenylene derivatives; or mixtures thereof. Preferably, the conductive material may be Denka black.

The binder functions to adhere the cathode active material particles, i.e. NaCl particles, sufficiently to one another and to adhere the cathode active material sufficiently to the current collector. Particular examples of the binder may include, but are not limited to: polyvinyl alcohol, carboxymethyl cellulose, hydroxypropyl cellulose, polyvinyl chloride, carboxylated polyvinyl chloride, polyvinyl fluoride, ethylene oxide-containing polymers, polyvinyl pyrrolidone, polyurethane, polytetrafluoroethylene, polyvinylidene fluoride, polyethylene, polypropylene, styrene-butadiene rubber, acrylated styrene-butadiene rubber, epoxy rubber, nylon, or the like. Preferably, the binder may be polyvinylidene fluoride.

The solvent may include an organic solvent, such as N-methyl-2-pyrrolidone (NMP), and may be used in such an amount that a desired degree of viscosity may be obtained when the cathode active material, conductive material and the binder are totally incorporated to the solvent. For example, the solvent may be used in such an amount that the solid content in the slurry composition including the cathode active material, conductive material and the binder may be 20-85 wt %, preferably 30-70 wt %.

Next, a pre-charge step and pre-discharge step are carried out, wherein charge and discharge are performed under specific ranges of voltage and C-rate preliminarily to the charge/discharge currently carried out in use of the resultant secondary battery. In this manner, a structural phase change is induced in the cathode active material.

The pre-charge step may be carried out by charging the secondary battery to 4.0-4.23V at 0.03-0.05 C-rate.

In the pre-charge step, the secondary battery is charged to 4.0-4.23V at 0.03-0.05 C-rate to form a plurality of vacancies in the crystal structure of the cathode active material. The pre-charge step is carried out preferably to 4.0-4.23V. This is because vacancies can be formed to such a degree that a structural phase change of the cathode active material may be induced, when the secondary battery is charged to the above-defined range of voltage. When the secondary battery is charged to a voltage less than 4.0V, the cathode active material starts to be decomposed undesirably. When the secondary battery is charged to a voltage higher than 4.23V, the electrolyte starts to be decomposed undesirably.

The pre-discharge step may be carried out by discharging the secondary battery to 0.1-0.5V at 0.03-0.05 C-rate.

In the pre-discharge step, the secondary battery is discharged to 0.1-0.5V at 0.03-0.05 C-rate to induce a structural phase change in the cathode active material. In the pre-discharge step, while metal ions are intercalated into the structure of the cathode active material having the vacancies formed from the pre-charge step, a structural phase change is induced. The pre-discharge step is carried out preferably to a voltage of 0.1-0.5V. When the discharge voltage is less than 0.1V, Na ions can be intercalated into the cathode active material crystal structure, but can be hardly deintercalated therefrom undesirably. In addition, when the discharge voltage is higher than 0.5V, Na ions can be hardly intercalated into the cathode active material structure undesirably. In other words, when the discharge voltage is lower than 0.1V or higher than 0.5V, irreversibility is increased in Na ion intercalation/deintercalation undesirably.

Herein, 'C-rate' representing the charge rate or discharge rate determines the content of Na ions intercalated/deintercalated to/from the structure. When C-rate is increased, the content of Na ions intercalated into the structure is decreased.

For example, when the charge rate is 0.03 C-rate, 0.6 Na ions are intercalated into the structure ($Na_{1.6}Cl$ formed). In the case of 0.05 C-rate, 0.4 Na ions are intercalated into the structure ($Na_{1.41}Cl$ formed). Therefore, C-rate may be varied depending on the content of Na to be intercalated into the structure. However, it is preferred that C-rate ranges from 0.03 to 0.05 C-rate. When C-rate is less than the above-defined range, the cathode active material structure may collapse. When C-rate exceeds the above-defined range, the absolute content of ions participating in deintercalation is insufficient, thereby making it difficult to induce a structural phase change.

Particularly, the anode is Na metal, and the cathode active material may show a difference in Na content of 7 at % or more between the fully discharged state and fully charged state of the secondary battery, as analyzed by the energy dispersive spectroscopy (EDS) thereof. The expression 'fully charged state of the secondary battery' refers to the maximum charged state based on the battery capacity in the state of normal use, and covers a range of ±5% of the theoretically fully charged state. The expression 'fully discharged state of the secondary battery' refers to a substantially fully discharged state of the battery, including a non-charged state after the manufacture of the secondary battery, theoretically fully discharged state, or a state that can be regarded as a substantially fully discharged state (a range of ±5% of the theoretically fully discharged state).

As described above, in the secondary battery, NaCl contained as a cathode active material undergoes a phase change into a structure capable of Na ion intercalation/deintercalation. During charge/discharge, Na ions are intercalated/deintercalated into/from the cathode active material structure. Thus, there is a significantly large difference in Na ion content. It is preferred that the difference in Na ion content is 7 at % or more between the fully discharged state and the fully charged state, since this provides excellent capacity characteristics based on smooth Na ion intercalation/deintercalation.

Although it is not described clearly in the following examples and comparative examples, secondary batteries were obtained by modifying various conditions in the method for preparing NaCl in B2 phase according to the present disclosure, and the secondary batteries were determined for electrochemical characteristics (capacity characteristics, cycle characteristics) and analyzed through XRD, TEM and EDS.

As a result, unlike the other conditions and the other numeral ranges, it is shown that when the following conditions are totally satisfied, the resultant secondary battery shows a discharge capacity of 250 $mAhg^{-1}$ at 0.03 C-rate and a capacity retention of 30% or more, based on the initial capacity, after 20 charge/discharge cycles at 0.05 C-rate, and has a content of NaCl in B2 phase of 90% or more based on the total NaCl content contained in the cathode active material, as determined by XRD, TEM and EDS:

(i) The pre-charge step is carried out by charging the secondary battery to 4.2V at 0.03 C-rate, (ii) the pre-discharge step is carried out by discharging the secondary battery to 0.1V at 0.03 C-rate, (iii) the structural phase change is a change from NaCl in B1 phase into NaCl in B2 phase, (iv) the cathode is obtained by the method including the steps of: mixing a cathode active material, a conductive material and a binder in a solvent to obtain a slurry composition; and coating the slurry composition on a current collector, followed by drying, (v) the conductive material is Denka black, (vi) the binder is PVdF, and (vii) the anode is Na metal.

However, when any one of the above-mentioned conditions is not satisfied, the resultant secondary battery shows rapid degradation, as can be seen from a discharge capacity less than 200 $mAhg^{-1}$ at 0.03 C-rate and a capacity retention less than 20%, based on the initial capacity, after 20 charge/discharge cycles at 0.05 C-rate. It can be also seen that the content of NaCl in B2 phase is significantly decreased to less than 70% based on the total content of NaCl contained in the cathode active material.

In still another aspect of the present disclosure, there is provided a method for manufacturing a cathode for a secondary battery, including a step of carrying out electrochemical charge/discharge of NaCl in B1 phase.

The step of carrying out electrochemical charge/discharge of NaCl in B1 phase may include the steps of: forming a secondary battery which includes a cathode active material including NaCl in B1 phase; a pre-charge step of charging the secondary battery to form a plurality of vacancies in the crystal structure of NaCl; and a pre-discharge step of discharging the secondary battery to cause a structural phase change of NaCl.

The pre-charge step may be carried out by charging the secondary battery to 4.0-4.23V at 0.03-0.05 C-rate.

The pre-discharge step may be carried out by discharging the secondary battery to 0.1-0.5V at 0.03-0.05 C-rate.

Particular effects of the conditions of the method for manufacturing the cathode for a secondary battery are the same as the above description about the method for preparing NaCl in B2 phase, and thus will be omitted herein.

In still another aspect of the present disclosure, there is provided a method for manufacturing a secondary battery, including a step of carrying out electrochemical charge/discharge of NaCl in B1 phase.

The step of carrying out electrochemical charge/discharge of NaCl in B1 phase may include the steps of: forming a secondary battery which includes a cathode active material including NaCl in B1 phase; a pre-charge step of charging the secondary battery to form a plurality of vacancies in the crystal structure of NaCl; and a pre-discharge step of discharging the secondary battery to cause a structural phase change of NaCl.

The pre-charge step may be carried out by charging the secondary battery to 4.0-4.23V at 0.03-0.05 C-rate.

The pre-discharge step may be carried out by discharging the secondary battery to 0.1-0.5V at 0.03-0.05 C-rate.

Particular effects of the conditions of the method for manufacturing a secondary battery are the same as the above description about the method for preparing NaCl in B2 phase, and thus will be omitted herein.

When manufacturing and selling a secondary battery obtained by the method for manufacturing a secondary battery according to the present disclosure, it is possible to sell a secondary battery including NaCl in B2 phase as a cathode active material by carrying out all of the above methods. However, it is also possible to form and sell a secondary battery including NaCl in B1 phase as a cathode active material so that the consumers may carry out a pre-charge step and pre-discharge step directly to accomplish a structural phase change in NaCl, before the battery is used in earnest.

The examples and experiments will now be described. The following examples and experiments are for illustrative purposes only and not intended to limit the scope of this disclosure. In addition, it will be apparent to those skilled in the art that various changes and modifications may be made based on the disclosure of the present disclosure including the following examples, and the changes and modifications are also within the scope of the present disclosure as defined in the following claims.

COMPARATIVE EXAMPLE 1. MANUFACTURE OF SODIUM ION SECONDARY BATTERY

First, NaCl in B1 (Fm-3m) phase commercially available from Sigma Aldrich Co. was obtained and used as a cathode active material. NaCl, Denka black and polyvinylidene fluoride (PVdF) were mixed at a weight ratio of 7:2:1 in N-methyl pyrrolidone (NMP) to prepare an electrode slurry composition. The electrode slurry composition was cast onto Al foil to obtain a NaCl working electrode and dried in an oven at 80° C. for 4 hours before carrying out an electrochemical test.

Next, the resultant NaCl working electrode, Na as a counter electrode, a separator made of polypropylene (PP), and an electrolyte including 1M $NaClO_4$ dissolved in polyethylene carbonate (PC) organic solvent containing 2 wt % of fluoroethylene carbonate (FEC) dissolved therein were used to fabricate a coin-type half-cell (CR2032). The cell was fabricated in a glove box filled with argon gas containing 0.1 ppm or less of $H_2O$ and $O_2$.

EXAMPLE 1. MANUFACTURE OF SODIUM ION SECONDARY BATTERY

First, NaCl in B1 (Fm-3m) phase commercially available from Sigma Aldrich Co. was obtained and used as a cathode active material. NaCl, Denka black and polyvinylidene fluoride (PVdF) were mixed at a weight ratio of 7:2:1 in N-methyl pyrrolidone (NMP) to prepare an electrode slurry composition. The electrode slurry composition was cast onto Al foil to obtain a NaCl working electrode and dried in an oven at 80° C. for 4 hours before carrying out an electrochemical test.

Next, the resultant NaCl working electrode, Na as a counter electrode (Na metal was used), a separator made of polypropylene (PP), and an electrolyte including 1M $NaClO_4$ dissolved in polyethylene carbonate (PC) organic solvent containing 2 wt % of fluoroethylene carbonate (FEC) dissolved therein were used to fabricate a coin-type half-cell (CR2032). The cell was fabricated in a glove box filled with argon gas containing 0.1 ppm or less of $H_2O$ and $O_2$.

Then, NaCl in the working electrode of the resultant coin-type half-cell was allowed to undergo a phase change from B1 into B2. More particularly, the phase change of NaCl included the following two steps.

In the first step, the coin-type half-cell was charged to 4.2V at 0.03 C-rate through an electrochemical process (pre-charge activation process, activation cycle). While vacancies were induced intentionally in the NaCl cathode active material structure during the pre-charge step, a partial phase change from B1 into B2 was generated.

In the second step, the coin-type half-cell was discharged to 0.1V (discharge step, activation cycle). During this step, Na ions were intercalated into the NaCl cathode active material structure having vacancies, thereby providing a secondary battery including NaCl in B2 phase as a cathode active material. During the discharge step, electrochemically activated NaCl in B2 phase accepted Na ions efficiently to produce a Na-enriched compound ($Na_xCl$, x>1).

TEST EXAMPLE 1. X-RAY DIFFRACTOMETRY (XRD)

Figure 1:
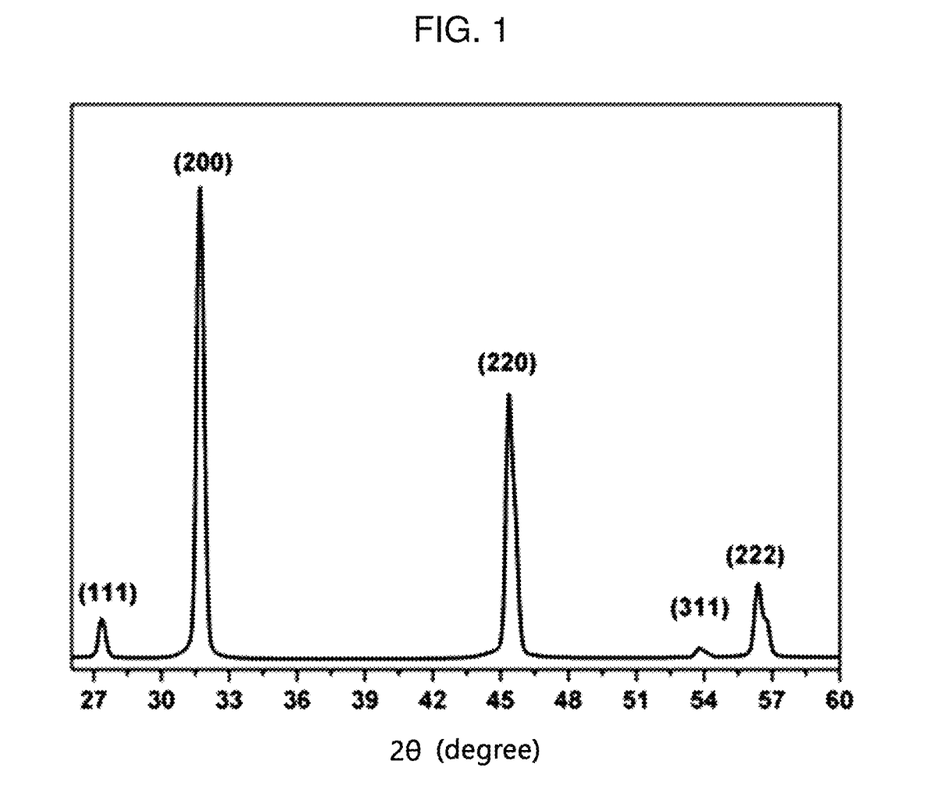
FIG. 1 is a graph illustrating the characteristics of the cathode active material for a sodium ion secondary battery according to a comparative example, as determined by X-ray diffractometry.

Each of the cathodes of the sodium ion secondary batteries according to Example 1 and Comparative Example 1 was analyzed by X-ray diffractometry (XRD). FIG. 1 is a graph illustrating the characteristics of the cathode active material for a sodium ion secondary battery according to Comparative Example 1, as determined by XRD, and FIG. 2 is a graph illustrating the characteristics of the cathode active material for a sodium ion secondary battery according to Example 1, as determined by XRD.

Figure 2:
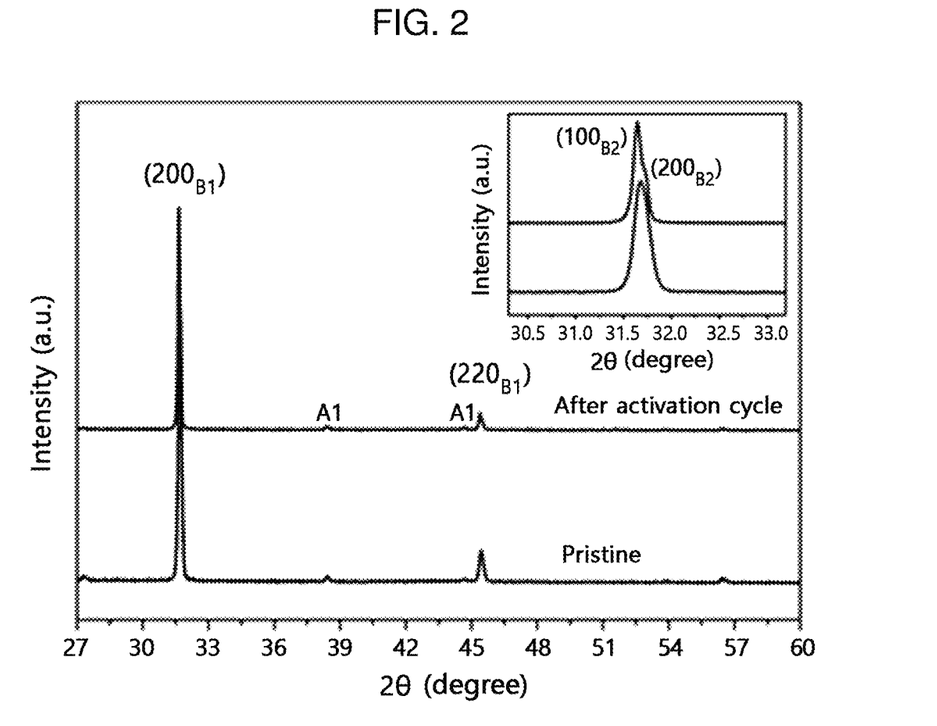
FIG. 2 is a graph illustrating the characteristics of the cathode active material for a sodium ion secondary battery according to an embodiment of the present disclosure, as determined by X-ray diffractometry.

As can be seen from FIG. 1 and FIG. 2, NaCl in the cathode of the sodium ion secondary battery according to Comparative Example 1 exists in pure B1 phase, belongs to a space group of Fm-3m, and has lattice parameters of a=b=c=5.6314 Å.

On the contrary, it can be seen that NaCl in the cathode of the sodium ion secondary battery according to Example 1 belongs to a space group of Pm-3m and has lattice parameters of a=b=c=2.8623 Å, and thus exists in B2 phase.

TEST EXAMPLE 2. ANALYSIS OF ELECTROCHEMICAL CHARACTERISTICS

Each of the secondary batteries according to Example 1 and Comparative Example 1 was evaluated for electrochemical characteristics.

Figure 3:
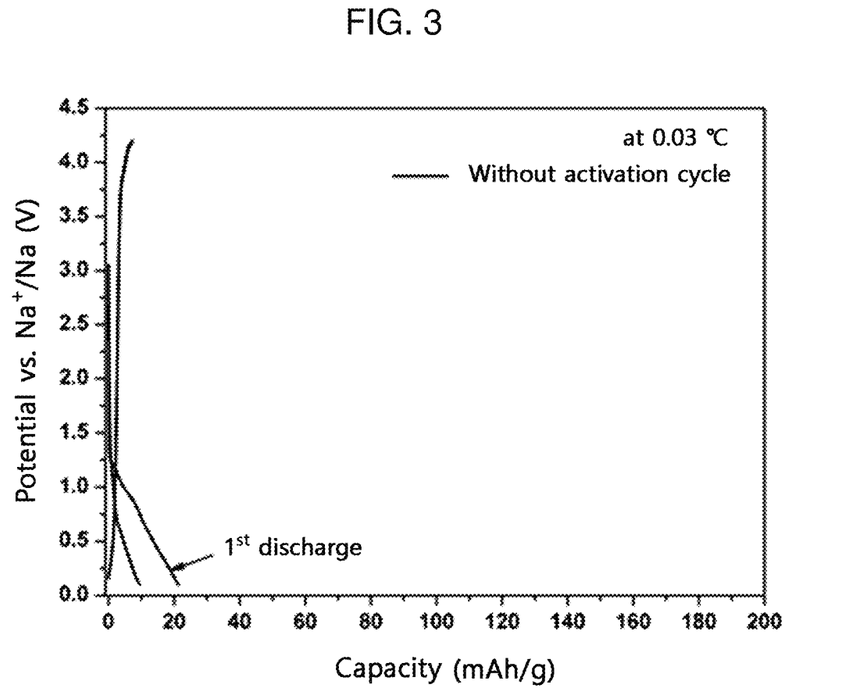
FIG. 3 is a graph illustrating the charge/discharge test results of the sodium ion secondary battery according to Comparative Example at 0.03 C-rate (voltage range: 0.1-4.23V).
Figure 4:
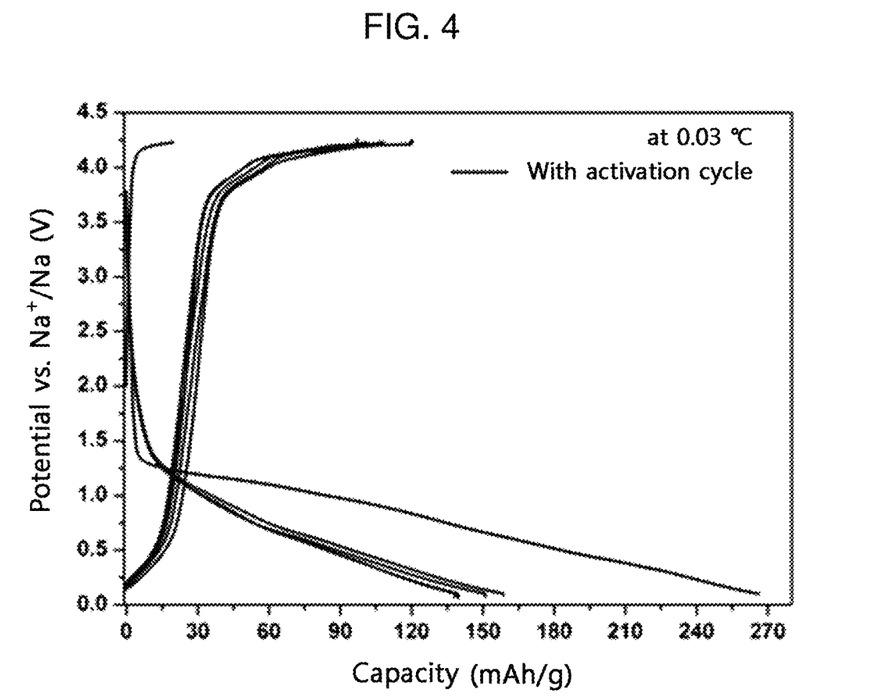
FIG. 4 is a graph illustrating the charge/discharge test results of the sodium ion secondary battery according to an embodiment of the present disclosure at 0.03 C-rate (voltage range: 0.1-4.23V).

FIG. 3 is a graph illustrating the charge/discharge test results of the sodium ion secondary battery according to Comparative Example 1 at 0.03 C-rate (voltage range: 0.1-4.23V), and FIG. 4 is a graph illustrating the charge/discharge test results of the sodium ion secondary battery according to Example 1 at 0.03 C-rate (voltage range: 0.1-4.23V).

Figure 5:
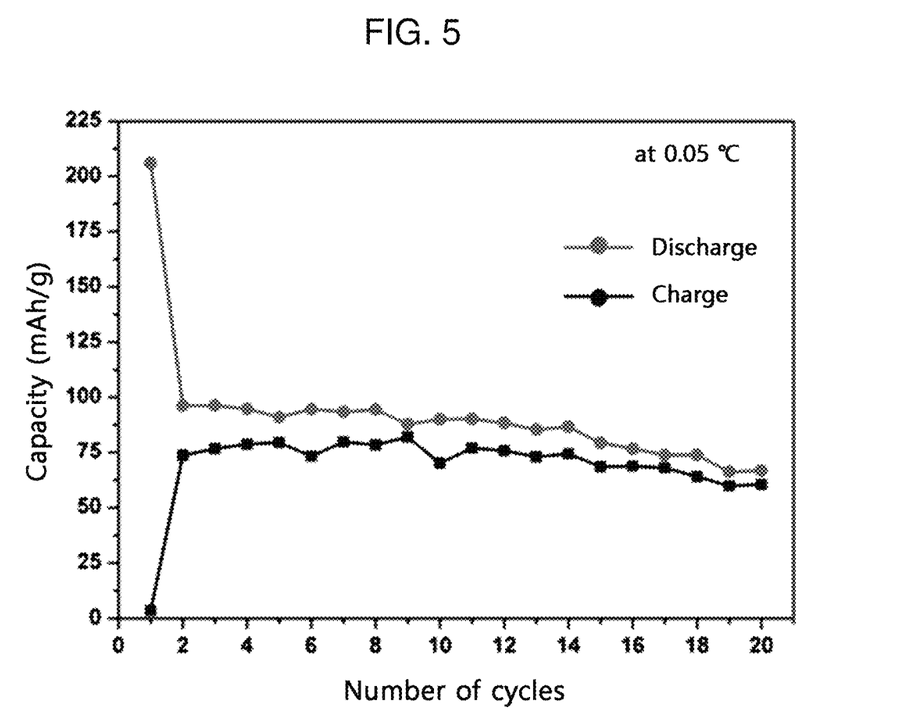
FIG. 5 is a graph illustrating the cycle test results of the sodium ion secondary battery according to an embodiment of the present disclosure at 0.05 C-rate.

FIG. 5 is a graph illustrating the cycle test results of the sodium ion secondary battery according to Example 1 at 0.05 C-rate.

As shown in FIG. 3, the secondary battery (Comparative Example 1) including NaCl in B1 phase as a cathode active material shows a discharge capacity of 20 mAhg$^{-1}$ in a voltage range of 0.1-4.23V at 0.03 C-rate. On the contrary, the secondary battery including NaCl in B2 phase as a cathode active material according to Example 1 shows a discharge capacity of 280 mAhg$^{-1}$ in a voltage range of 0.1-4.23V at 0.03 C-rate. In other words, the secondary battery according to Example 1 has a discharge capacity at least 10 times higher than the discharge capacity of the secondary battery according to Comparative Example 1.

In addition, as shown in FIG. 5, the secondary battery according to Example 1 has an initial discharge capacity of 207 mAhg$^{-1}$ and a discharge capacity of 60 mAhg$^{-1}$ after 20 charge/discharge cycles, at 0.05 C-rate. Thus, the secondary battery according to Example 1 retains 28.99% of capacity based on the initial capacity. As a result, it can be seen that the secondary battery according to Example 1 has excellent cycle characteristics.

TEST EXAMPLE 3. TRANSMISSION ELECTRON MICROSCOPY AND ENERGY DISPERSIVE SPECTROSCOPY

Figure 6:
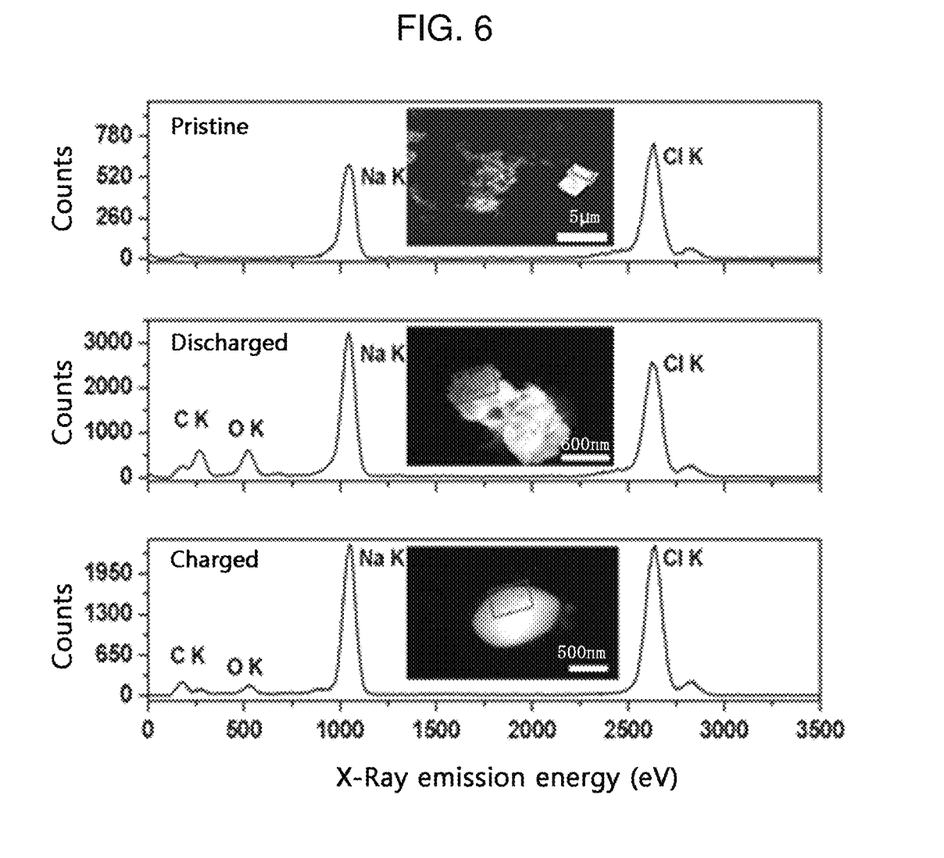
FIG. 6 shows the analysis results of the cathode active material for a sodium ion secondary battery according to an embodiment of the present disclosure, as determined by transmission electron microscopy (TEM) and energy dispersive spectroscopy (EDS).

FIG. 6 shows the analysis results of the cathode active material for a sodium ion secondary battery according to an embodiment of the present disclosure, as determined by transmission electron microscopy (TEM) and energy dispersive spectroscopy (EDS). In FIG. 6, the Na content and Cl content in the cathode of the secondary battery according to Example 1 can be determined in the initial state (Pristine), fully discharged state and the fully charged state thereof.

As can be seen from FIG. 6, in the initial state, the Na content and Cl content are 45.7 at % and 54.3 at %, respectively. In the fully discharged state during the pre-discharge step, the Na content and Cl content are 61.3 at % and 38.7 at %, respectively. In the fully charged state during the pre-charge step, the Na content and Cl content are 52 at % and 48 at %, respectively. It can be seen from the above results that the content of Na ions is increased due to Na ion intercalation after the pre-charge/discharge steps and is decreased due to Na ion deintercalation after the discharge step.

Therefore, according to the present disclosure, it is possible to obtain a secondary battery having excellent electrochemical characteristics by electrochemically inducing a structural phase change in the cathode active material of a secondary battery including NaCl as a cathode active material.

While the present disclosure has been described with respect to the specific embodiments, it will be apparent to those skilled in the art that various changes and modifications may be made without departing from the spirit and scope of the disclosure as defined in the following claims.

What is claimed is:

1. A cathode for a secondary battery, comprising a cathode active material including NaCl in B2 phase.

2. The cathode for a secondary battery according to claim 1, wherein said NaCl has a crystal structure of cubic system, belongs to a space group of Pm-3m, and has lattice parameters of a=2.8600-2.8630 Å, b=2.8600-2.8630 Å and c=2.8600-2.8630 Å.

3. The cathode for a secondary battery according to claim 1, wherein said NaCl has a (100)$_{B2}$ peak at a 2theta between 31.25° and 31.70° in X-ray diffractometry.

4. A secondary battery comprising the cathode for a secondary battery as defined in claim 1.

5. An electrical device comprising the secondary battery as defined in claim 4.

* * * * *